US012785106B2

(12) United States Patent
Matsuda et al.

(10) Patent No.: US 12,785,106 B2
(45) Date of Patent: Nov. 3, 2026

(54) OXYGEN CHANNEL AND COLLECTOR FOR AIR CELLS, AND AIR CELL

(71) Applicant: NATIONAL INSTITUTE FOR MATERIALS SCIENCE, Tsukuba (JP)

(72) Inventors: Shoichi Matsuda, Tsukuba (JP); Eiki Yasukawa, Tsukuba (JP); Shoji Yamaguchi, Tsukuba (JP); Hirofumi Kakuta, Tokyo (JP); Shuntaro Miyakawa, Tokyo (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 598 days.

(21) Appl. No.: 18/276,573

(22) PCT Filed: Dec. 17, 2021

(86) PCT No.: PCT/JP2021/046716
§ 371 (c)(1),
(2) Date: Aug. 9, 2023

(87) PCT Pub. No.: WO2022/176367
PCT Pub. Date: Aug. 25, 2022

(65) Prior Publication Data

US 2024/0313229 A1 Sep. 19, 2024

(30) Foreign Application Priority Data

Feb. 22, 2021 (JP) ................................ 2021-026282

(51) Int. Cl.
*H01M 4/66* (2006.01)
*H01M 4/36* (2006.01)
(Continued)

(52) U.S. Cl.
CPC .............. *H01M 4/66* (2013.01); *H01M 4/36* (2013.01); *H01M 4/74* (2013.01); *H01M 12/08* (2013.01);
(Continued)

(58) Field of Classification Search
CPC ........... H01M 4/66; H01M 4/36; H01M 4/74; H01M 12/08; H01M 2004/021;
(Continued)

(56) References Cited

U.S. PATENT DOCUMENTS 11,208,564 B2 * 12/2021 Gerard .................... C08J 5/042
2007/0224495 A1 9/2007 Gibbons et al.
(Continued)

FOREIGN PATENT DOCUMENTS

JP 2002-015737 A 1/2002
JP 2009-530785 A 8/2009
(Continued)

OTHER PUBLICATIONS

Marina Normann, Yordan Kyosev, Andrea Ehrmann & Anne Schwarz-Pfeiffer, Multilayer Textile-Based Woven Batteries pp. 129-136, First Online: Mar. 5, 2016 (Year: 2016).*
(Continued)

*Primary Examiner* — Jennifer Dieterle
(74) *Attorney, Agent, or Firm* — Morgan, Lewis & Bockius LLP

(57) ABSTRACT

The present invention addresses the problem of providing an oxygen channel for air cells, the oxygen channel having high aperture ratios (specifically, high planar aperture ratio and high cross-sectional aperture ratio), specifically, an oxygen channel for air cells, wherein both the planar aperture ratio and the cross-sectional aperture ratio are 50% or more, preferably 60% or more.

The present invention provides an oxygen channel for air cells, the oxygen channel being composed of a structure that
(Continued)

(E) = "fiber diameter of one lateral fiber (μm)/1000 (μm/mm)" + "fiber diameter of one longitudinal fiber (μm)/1000 (μm/mm)"
(Here, unit of (E) is "mm")

(F) = "1/lateral fiber density (fibers/mm)"
(Here, unit of (F) is "mm")

comprises two kinds of resin fibers having different fiber diameters in a mesh form, wherein the ratio of the fiber diameter of resin fibers having the larger fiber diameter to the fiber diameter of resin fibers having the smaller fiber diameter is within the range from 1.2 to 7.

17 Claims, 5 Drawing Sheets

(51) Int. Cl.
*H01M 4/74* (2006.01)
*H01M 12/08* (2006.01)
*H01M 4/02* (2006.01)
*H01M 4/86* (2006.01)

(52) U.S. Cl.
CPC ............................ *H01M 2004/021* (2013.01); *H01M 2004/028* (2013.01); *H01M 2004/8689* (2013.01)

(58) Field of Classification Search
CPC ... H01M 2004/028; H01M 2004/8689; H01M 4/02; H01M 4/86; H01M 4/668; Y02E 60/50; Y02E 60/10
See application file for complete search history.

(56) References Cited

U.S. PATENT DOCUMENTS

| | | | | |
|---|---|---|---|---|
| 2014/0332731 | A1* | 11/2014 | Ma | C09D 7/70 252/506 |
| 2016/0111730 | A1 | 4/2016 | Kim et al. | |
| 2017/0244106 | A1 | 8/2017 | Mortensen | |
| 2019/0207218 | A1* | 7/2019 | Zheng | C23C 18/405 |
| 2020/0006829 | A1 | 1/2020 | Kitagawa et al. | |
| 2022/0041970 | A1* | 2/2022 | Makita | D01D 7/00 |
| 2022/0407082 | A1* | 12/2022 | Nishimura | C08K 3/08 |
| 2023/0033163 | A1* | 2/2023 | Isomura | H01M 4/13 |
| 2024/0213494 | A1* | 6/2024 | Zheng | H01M 4/661 |

FOREIGN PATENT DOCUMENTS

| | | | | |
|---|---|---|---|---|
| JP | 2013-073765 | A | | 4/2013 |
| JP | 2016-126842 | A | | 7/2016 |
| JP | 2019065349 | | * | 4/2019 |
| WO | 2018/168866 | A1 | | 9/2018 |

OTHER PUBLICATIONS

Translation JP2019065349 (Year: 2026).*
Copper- and nickel-based flexible polyester electrodes for energy storage devices Received: Feb. 18, 2020; accepted: May 27, 2020 Abdulcabbar Yavuz (Year: 2020).*
Kathrine Bourzac, Tough Textile Batteries, 2013 (Year: 2013).*
Euler, Textile Electrodes: Influence of Knitting Construction and Pressure on the Contact Impedance, Feb. 24, 2021 (Year: 2021).*
Office Action issued in Korean Patent Application 10-2023-7027775 dated Aug. 28, 2025.
International Search Report (with partial translation) issued Feb. 15, 2022, issued in corresponding International Patent Application No. PCT/JP2021/046716.

* cited by examiner

FIG. 3

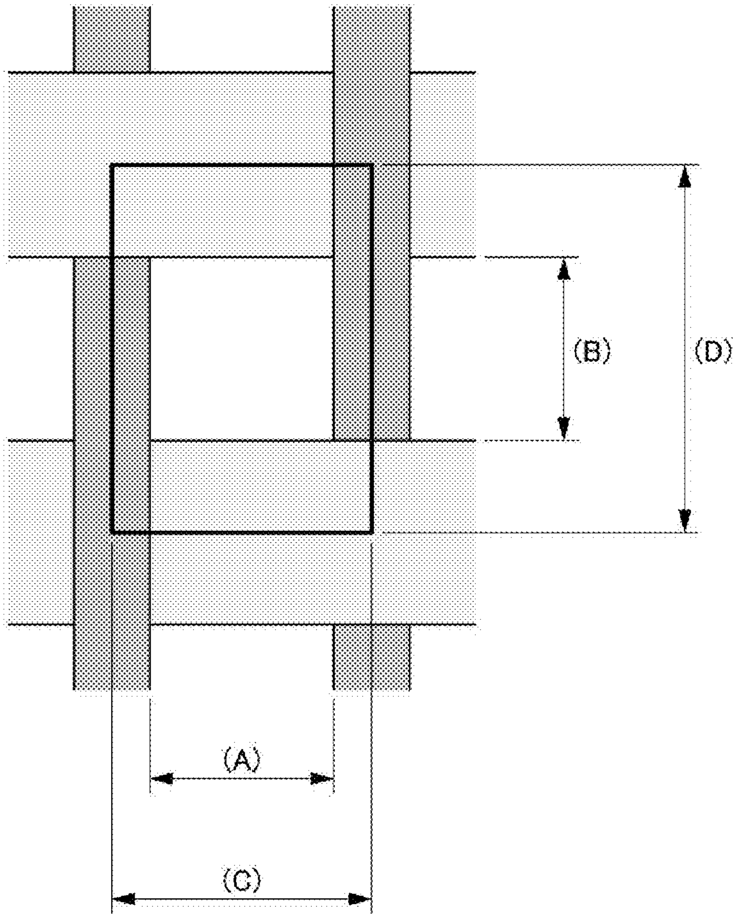

(A) = "1/longitudinal fiber density (fibers/mm)" – "fiber diameter of one longitudinal fiber (μm)/1000 (μm/mm)"
(Here, "one longitudinal fiber diameter" is subtracted from "lateral pitch" to show "lateral width of planar opening portion". Unit of (A) is "mm")

(B) = "1/lateral fiber density (fibers/mm)" – "fiber diameter of one lateral fiber (μm)/1000 (μm/mm)"
(Here, "one lateral fiber diameter" is subtracted from "longitudinal pitch" to show "longitudinal width of planar opening portion". Unit of (B) is "mm")

(C) = "1/longitudinal fiber density (fibers/mm)"
(Here, unit of (C) is "mm" and this value shows "lateral pitch")

(D) = "1/lateral fiber density (fibers/mm)"
(Here, unit of (D) is "mm" and this value shows "longitudinal pitch")

(E) = "fiber diameter of one lateral fiber (μm)/1000 (μm/mm)" + "fiber diameter of one longitudinal fiber (μm)/1000 (μm/mm)"
(Here, unit of (E) is "mm")

(F) = "1/lateral fiber density (fibers/mm)"
(Here, unit of (F) is "mm")

OXYGEN CHANNEL AND COLLECTOR FOR AIR CELLS, AND AIR CELL

TECHNICAL FIELD

The present invention relates to an oxygen channel constituting a positive electrode of an air cell and a collector including the oxygen channel, and an air cell including the oxygen channel or the collector. As for the air cell, the present invention particularly relates to a lithium-air secondary cell in which oxygen is used as a positive electrode active material.

BACKGROUND ART

Cells have attracted attention as a driving force that supports a smart society, and demand for cells has been rapidly increasing. There are various types of cells, and among them, air cells have received a lot of attention in terms of having a structure suitable for achieving small size, light weight, and large capacity.

The air cells are a cell using oxygen in the air as a positive electrode active material and a metal as a negative electrode active material, also referred to as a metal air cell, and a cell positioned as one kind of fuel cell.

An air cell is disclosed in, for example, Patent Literature 1. As a representative example of the air cell, a lithium-air cell that uses, as a negative electrode active material, a metal or compound capable of occluding and releasing lithium is disclosed therein.

In an air cell, a positive electrode active material is oxygen in the air, and the positive electrode active material can be supplied from the outside of the cell, and thus the air cell has a structure that is capable of making size of the cell smaller and making weight of the cell lighter and that is further suitable for making the capacity of the cell greater.

In Patent Literature 2, a laminated air cell is studied for the purpose of making the capacity of the air cell greater.

CITATION LIST

Patent Literature

PATENT LITERATURE 1: JP 2002-15737 A
PATENT LITERATURE 2: JP 2013-73765 A

SUMMARY OF INVENTION

Technical Problem

However, conventional air cells (including conventional laminated air cells) cannot be said to sufficiently bring out their potential abilities of making size of the cells smaller, making weight of the cells lighter, making capacity of the cells greater, and the like, and thus improvement of their potential abilities has been desired even now. One of the causes of not sufficiently bring out their potential abilities lies in the positive electrode (specifically, the structural body constituted by a positive electrode layer, an oxygen channel, and a collector). The oxygen channel is also referred to as "oxygen channel structural body" or "oxygen channel layer", and the collector is also referred to as "positive electrode collector" in order to intentionally distinguish the collector from the collector constituting the negative electrode (that is, "negative electrode collector").

The property of exhibiting both permeability for smooth discharge of oxygen generated at an electrode on charge and high diffusivity of oxygen in the electrode on discharge is referred to as "permeation diffusivity". In a positive electrode of an air cell (in particular, positive electrode of a laminated air cell), the oxygen channel contributing to take in and discharge of oxygen needs to have both permeation diffusivity from the cross-sectional direction of the oxygen channel and permeation diffusivity in the planar direction of the oxygen channel, and it is required that an opening ratio (specifically, "cross-sectional opening ratio" and "planar opening ratio") is large. That is, an oxygen channel constituting a positive electrode of an air cell (particularly, "laminated air cell") is required to have a structure providing the high opening ratio that can take in and discharge a large amount of oxygen from the air. In the present application, a face of an oxygen channel for air cells when being viewed from directly above is referred to as "plane face", and a face (that is, "side face") of the oxygen channel when being viewed from right beside is referred to as "cross section". That is, a face when a cut opening obtained by cutting the oxygen channel in the vertical direction is viewed from right beside is the cross section. The ratio of an opening area per unit area in the plane is referred to as "planar opening ratio", and the ratio of an opening area per unit area in the cross section is referred to as "cross-sectional opening ratio".

The oxygen channel constituting the positive electrode is also required to have electron conductivity that is a characteristic generally required for a cell reaction field.

Additionally, it is also desired to reduce the manufacturing cost by making size of an air cell smaller and making weight of an air cell lighter.

Meanwhile, conventionally known oxygen channels and collectors constituting a positive electrode of air cells are generally produced using a metal having porosity, such as a porous metal body, a metal mesh, a grid, or a sponge (specifically, titanium, nickel, stainless steel, or aluminum) from the viewpoint of ease of handling. However, oxygen channels and collectors using such a metal have disadvantages that are difficult to be inherently solved, specifically, the following disadvantages: their weights become heavy (, which means that an area density becomes large); since voids that are a cause of porosity are irregularly present, the opening ratio in the cross-sectional direction cannot be specified and is difficult to control. As a result, there exist the problems in terms of making weight of the air cells lighter, making size of the air cells smaller, and the like.

Furthermore, a mesh-formed structural body in which only conductive resin fibers having same diameter are used as a base material (, which is so called "conductive mesh-formed structural body having same diameter") is also conventionally known, but the structural body has a problem that the cross-sectional opening ratio is low to use as an oxygen channel or collector constituting a positive electrode of an air cell and is not sufficient.

For these reasons, conventionally known oxygen channels constituting the positive electrodes of air cells generally have the following problems: weights of the oxygen channels are heavy; an opening ratio (specifically, "planar opening ratio" and/or "cross-sectional opening ratio") of the oxygen channels is insufficient; and the like. Thus, there exists the current situation that an oxygen channel for air cells capable of making its weight lighter; making both of its planar opening ratio and its cross-sectional opening ratio higher; and making its size smaller; and further making capacity of the air cells higher, compared with conventional oxygen channels for air cells is desired.

Furthermore, from the viewpoint of, for example, making size of air cells smaller and making weight of air cells lighter, there also exists the current situation that a collector that also serves as an oxygen channel for air cells is desired.

In view of such circumstances, an object of the present invention is to provide, for example, an oxygen channel for air cells that has a high opening ratio (specifically, "planar opening ratio" and "cross-sectional opening ratio"). Specifically, an object of the present invention is to provide an oxygen channel for air cells in which both of its planar opening ratio and its cross-sectional opening ratio are 50% or more, and preferably 60% or more.

An object of the present invention is to provide, for example, an oxygen channel for air cells that has a high gravimetric energy density, thereby making weight of the air cells smaller and making capacity of the air cells higher. Specifically, an object of the present invention is to provide an oxygen channel for air cells that has an area density of 10.0 mg/cm$^2$ or less, and preferably 4.0 mg/cm$^2$ or less.

An object of the present invention is to provide, for example, an oxygen channel for air cells that can make its size smaller. Specifically, an object of the present invention is to provide an oxygen channel for air cells that has a thickness in a range of from 50 μm or more to 300 μm or less, and preferably in a range of from 100 μm or more to 200 μm or less.

An object of the present invention is to provide, for example, an oxygen channel for air cells that can make capacity of the air cells greater in addition to make weight of the air cells lighter and make size of the air cells smaller.

An object of the present invention is to provide, for example, a collector including the above oxygen channel (specifically, collector that also serves as an oxygen channel, that is, a collector having an oxygen channel function). In the present application, this collector is also referred to as "oxygen channel and positive electrode collector" or simply as "oxygen channel and collector".

An object of the present invention is to provide, for example, an air cell including an air cell including the above oxygen channel or the above "oxygen channel and collector".

Solution to Problem

As a result of intensive studies to solve the above problems, the present inventors have found that an oxygen channel for air cells that has a desired opening ratio, area density, and thickness can be provided, while a large capacity as an air cell is maintained, by providing a structural body including two kinds of resin fibers having different fiber diameters in a mesh form and setting the ratio between the different fiber diameters of the two kinds of resin fibers in a predetermined range, and thus the present invention has been completed.

Aspects of the present invention are specifically described in the following items [1] to [19].

[1] An oxygen channel for air cells comprising a structural body including two kinds of resin fibers in a mesh form, the two kinds of resin fibers having different fiber diameters, wherein in the two kinds of resin fibers, a ratio of a fiber diameter of resin fibers having a larger fiber diameter to a fiber diameter of resin fibers having a smaller fiber diameter is in a range of from 1.2 to 7.

[2] The oxygen channel for air cells according to [1] above, wherein the ratio of the fiber diameter of the resin fibers having the larger fiber diameter to the fiber diameter of the resin fibers having the smaller fiber diameter is in a range of from 2 to 6.

[3] The oxygen channel for air cells according to [1] or [2] above, wherein the fiber diameter of the resin fibers having the smaller fiber diameter is in a range of from 10 μm or more to 50 μm or less.

[4] The oxygen channel for air cells according to [1] or [2] above, wherein the fiber diameter of the resin fibers having the smaller fiber diameter is in a range of from 20 μm or more to 40 μm or less.

[5] The oxygen channel for air cells according to any one of [1] to [4] above, wherein the number of the resin fibers having the larger fiber diameter per unit length is in a range of from 1.0/mm or more to 3.6/mm or less, and the number of the resin fibers having the smaller fiber diameter per unit length is in a range of from 3.0/mm or more to 6.4/mm or less.

[6] The oxygen channel for air cells according to any one of [1] to [5] above, wherein the structural body has a thickness in a range of from 50 μm or more to 300 μm or less.

[7] The oxygen channel for air cells according to any one of [1] to [5] above, wherein the structural body has a thickness in a range of from 100 μm or more to 200 μm or less.

[8] The oxygen channel for air cells according to any one of [1] to [7] above, wherein the mesh form has a structure of alternately crossing the two kinds of resin fibers having the different fiber diameters one by one.

[9] The oxygen channel for air cells according to any one of [1] to [8] above, wherein the structural body includes the two kinds of resin fibers in a mesh form having a structure of alternately crossing the two kinds of resin fibers one by one, the structural body has a planar opening ratio of 50% or more, the planar opening ratio being a ratio of an opening area per unit area in a plane of the structural body, the structural body has a cross-sectional opening ratio of 50% or more, the cross-sectional opening ratio being a ratio of an opening area per unit area in a cross section of the structural body, wherein the plane of the structural body is a face viewed from a direction in which cross-stripes due to crossing of the two kinds of resin fibers are seen in a plane, and the cross section of the structural body is a face of a cut opening obtained by cutting the structural body in a vertical direction, the cut opening viewed from right beside.

[10] The oxygen channel for air cells according to [9] above, wherein the planar opening ratio is 60% or more.

[11] The oxygen channel for air cells according to [9] or [10] above, wherein the cross-sectional opening ratio is 60% or more.

[12] The oxygen channel for air cells according to any one of [1] to [11] above, wherein the planar opening ratio (%) and the cross-sectional opening ratio (%) are determined by calculation formulas described below:

[Mathematical 1]

$$\text{“Planar opening ratio (\%)”} = \frac{A \times B}{C \times D} \times 100 \qquad \text{(Formula 1)}$$

wherein "A" represents a lateral length of an opening portion and is defined by a formula described below:

"A"="1/density of resin fibers having a smaller fiber diameter (fibers/mm)"–"a fiber diameter of one resin fiber having a smaller fiber diameter (μm)/1000 (μm/mm)", "B" represents a longitudinal length of the opening portion and is defined by a formula described below:

"B"="1/density of resin fibers having a larger fiber diameter (fibers/mm)"–"a fiber diameter of one resin fiber having a larger fiber diameter (μm)/1000 (μm/mm)", "C" represents an adjacent distance between the resin fibers having a smaller fiber diameter and is defined by a formula described below:

"C"="1/density of resin fibers having a smaller fiber diameter (fibers/mm)",

"D" represents an adjacent distance between the resin fibers having a larger fiber diameter and is defined by a formula described below:

"D"="1/density of resin fibers having a larger fiber diameter (fibers/mm)",

[Mathematical 2]

$$\text{“Cross-sectional opening ratio (\%)”} = \frac{E \times F - (S + T)}{E \times F} \times 100 \quad \text{(Formula 2)}$$

wherein "E" represents a height of a unit cross-sectional area and is defined by a formula described below:

"E"="a fiber diameter of one resin fiber having a larger fiber diameter (μm)/1000 (μm/mm)"+"a fiber diameter of one resin fiber having a smaller fiber diameter (μm)/1000 (μm/mm)", "F" represents a lateral length of the unit cross-sectional area and is defined by a formula described below:

"F"="1/density of resin fibers having a larger fiber diameter (fibers/mm)",

"S" represents an area of resin fibers having a larger fiber diameter in the unit cross-sectional area, and is defined by a formula described below:

"S"=("a fiber diameter of one resin fiber having a larger fiber diameter (μm)/1000 (μm/mm)"/2)$^2$× 3.14, "T" represents an area of a resin fiber having a smaller fiber diameter in the unit cross-sectional area, and is defined by a formula described below:

"T"="a fiber diameter of resin fibers having a smaller fiber diameter (μm)/1000 (μm/mm)"×"1/density of resin fibers having a larger fiber diameter (fibers/mm)".

[13] The oxygen channel for air cells according to any one of [1] to [12] above, having an area density of 10 mg/cm$^2$ or less.

[14] The oxygen channel for air cells according to any one of [1] to [12] above, having an area density of 4.0 mg/cm$^2$ or less.

[15] The oxygen channel for air cells according to any one of [1] to [14] above, wherein the two kinds of resin fibers having the different fiber diameters include at least a polyester.

[16] A collector comprising the oxygen channel for air cells according to any one of [1] to [15] above, wherein the two kinds of resin fibers having the different fiber diameters are coated with a conductive substance.

[17] The collector according to [16] above, wherein the conductive substance is at least one metal selected from the group consisting of Ni, Cu, W, Al, Au, Ag, Pt, Fe, and Ti or an alloy containing the at least one metal.

[18] An air cell comprising:

a negative electrode;

a separator filled with a non-aqueous electrolytic solution; and a positive electrode, wherein the positive electrode includes a positive electrode layer, an oxygen channel for intake of oxygen as an active material, and a collector, and wherein the oxygen channel is the oxygen channel for air cells according to any one of [1] to [15] above.

[19] An air cell comprising:

a negative electrode;

a separator filled with a non-aqueous electrolytic solution; and a positive electrode, wherein the positive electrode includes a positive electrode layer, a collector including an oxygen channel for intake of oxygen as an active material, and a positive electrode lead, and wherein the collector is the collector according to [16] or [17] above.

Advantageous Effects of Invention

According to the present invention, the following effects can be obtained.

According to the present invention, for example, an oxygen channel for air cells of which an opening ratio (specifically, "planar opening ratio" and "cross-sectional opening ratio") is high can be provided. Specifically, an oxygen channel for air cells can be provided in which both of its planar opening ratio and its cross-sectional opening ratio are 50% or more, or furthermore 60% or more. As described above, since the cross-sectional opening ratio can also be increased, the oxygen channel for air cells can be used more preferably in a laminated air cell in which oxygen as an active material needs to be taken in from the cross-sectional direction of the oxygen channel.

According to the present invention, for example, an oxygen channel for air cells that has a high gravimetric energy density can be provided, thereby making weight of the air cells smaller and making capacity of the air cells. Specifically, an oxygen channel for air cells having an area density of 10.0 mg/cm$^2$ or less, or furthermore 4.0 mg/cm$^2$ or less can be provided.

According to the present invention, for example, an oxygen channel for air cells that can make size of the air cells smaller can be provided. Specifically; an oxygen channel for air cells having a thickness in a range of from 50 μm to 300 μm, or furthermore in a range of from 100 μm to 200 μm can be provided.

According to the present invention, for example, an oxygen channel for air cells that can sufficiently ensure a discharge capacity required when used in an air cell in addition to make weight of the air cells lighter and make size of the air cells smaller can be provided.

According to the present invention, for example, a collector that also serves as an oxygen channel (that is, an oxygen channel and collector) can be provided by applying a conductive treatment to the oxygen channel. Therefore, an oxygen channel and collector having a high opening ratio and an oxygen channel and collector of a light weight can be provided. In particular, the cross-sectional opening ratio can be enhanced in the oxygen channel and collector, and thus the oxygen channel and collector can be used preferably in a laminated air cell in which oxygen as an active material needs to be taken in from the cross-sectional direction of the oxygen channel. Use of such an oxygen channel and collector can further facilitate realization of making size of the air cells smaller.

According to the present invention, for example, an air cell can be provided that includes the oxygen channel or the oxygen channel and collector. Therefore, the abilities that air cells have potentially, that is, the abilities of making size of the air cells smaller, making weight of the air cells lighter, making capacity of the air cells greater, and the like can be improved.

BRIEF DESCRIPTION OF DRAWINGS

FIG. 3 is an enlarged view of cross-stripes portion per unit viewed from a planar direction (that is, plane view) of an oxygen channel for air cells that is one embodiment of the present invention.

DESCRIPTION OF EMBODIMENTS

Figure 1:
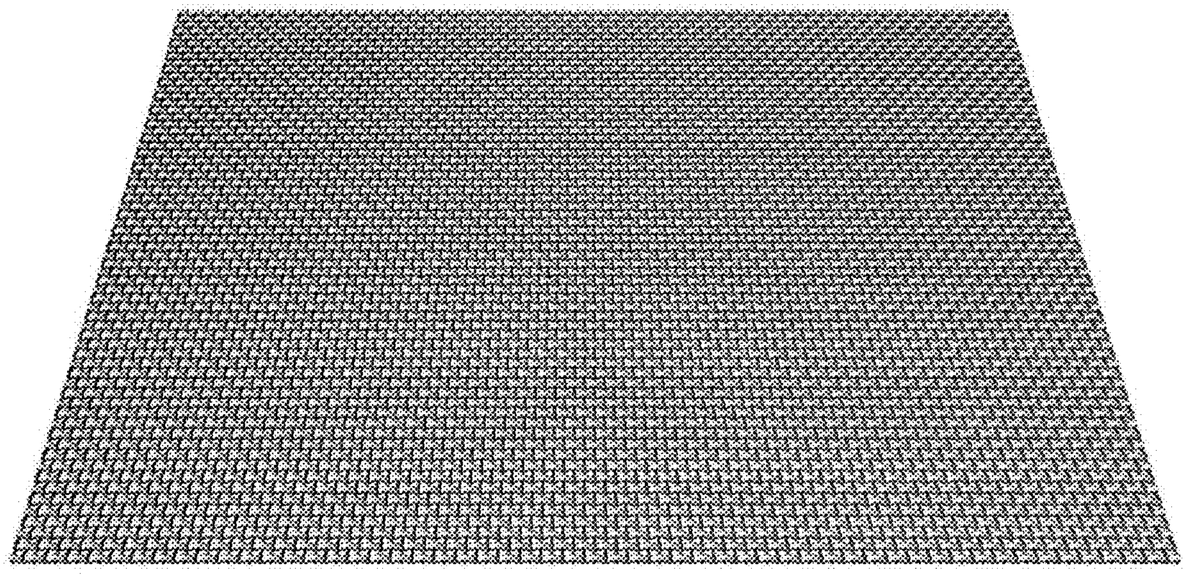
FIG. 1 is a perspective view of an oxygen channel for air cells that is one embodiment of the present invention.

One aspect of the present invention is an oxygen channel for air cells comprising a structural body including two kinds of resin fibers in a mesh form, the two kinds of resin fibers having different fiber diameters, wherein in the two kinds of resin fibers, a ratio of a fiber diameter of resin fibers having a larger fiber diameter to a fiber diameter of resin fibers having a smaller fiber diameter is in a range of from 1.2 to 7.

Here, the resin fibers are not particularly limited as long as an object of the present invention can be achieved, and for examples, the resin fibers include synthetic resin fibers such as polyester, aramid, nylon, vinylon, polyolefin, and rayon. The resin fibers may be one kind of synthetic resin fiber as a raw material or ones made of a combination of two or more kinds of synthetic resin fibers as a raw material.

It is preferred that the resin fibers are a polyester or contain at least a polyester. Polyester is preferable as a base for formation of a conductive layer, and highly versatile as a conductive resin fiber.

The form of each resin fiber constituting the resin fibers is not particularly limited as long as an object of the present invention can be achieved, and for example, each resin fiber constituting the resin fibers may be a resin fiber formed of one kind of resin or may be a mixed fiber formed of different kinds of resins.

The term "two kinds of resin fibers having different fiber diameters" mean the following: when comparing a fiber diameter of each fiber constituting one fibers of the two kinds of resin fibers and a fiber diameter of each fiber constituting the other fibers of the two kinds of resin fibers, a fiber of which the fiber diameter is relatively small fiber (, which is also referred to as "resin fiber having a smaller fiber diameter" in the present application) and a fiber of which the fiber diameter is relatively large (, which is also referred to as "resin fiber having a larger fiber diameter" in the present application) are present one of each.

The fiber diameter of the resin fibers having a smaller fiber diameter is preferably in a range of from 10 μm or more to 50 μm or less, and more preferably in a range of from 20 μm or more to 40 μm or less.

In a case where the fiber diameter of resin fibers having a smaller fiber diameter is referred to as "smaller fiber diameter" and the fiber diameter of the resin fibers having a larger fiber diameter is referred to as "larger fiber diameter", the ratio of the larger fiber diameter to the smaller fiber diameter (=(larger fiber diameter/smaller fiber diameter)) is in a range of from 1.2 to 7, preferably in a range of from 2 to 6, and more preferably 4 or more and 6 or less. Setting the ratio of the larger fiber diameter to the smaller fiber diameter to 1.2 or more is desirable in order to obtain a high opening ratio. Setting the ratio of the larger fiber diameter to the smaller fiber diameter to 7 or less is desirable in terms of producing a mesh (particularly, it is desirable in terms of making each adjacent distance between the resin fibers equal by avoiding sideslip of resin fibers constituting the mesh).

The fiber diameter of resin fibers having a larger fiber diameter is in a range that satisfies the above ratio.

The number of the resin fibers having a smaller fiber diameter per unit length (that is, density of the resin fibers) is preferably 76 fibers/inch or more and 163 fibers/inch or less (i.e., 3.0 fibers/mm or more and 6.4 fibers/mm or less), and more preferably 80 fibers/inch or more and 160 fibers/inch or less (that is, 3.1 fibers/mm or more and 6.3 fibers/mm or less).

The density of resin fibers having a larger fiber diameter is preferably 25 fibers/inch or more and 91 fibers/inch or less (i.e., 1.0 fibers/mm or more and 3.6 fibers/mm or less), and more preferably 29 fibers/inch or more and 90 fibers/inch or less (that is, 1.1 fibers/mm or more and 3.5 fibers/mm or less).

The mesh means a material formed by weaving the resin fibers having a smaller fiber diameter and the resin fibers having a larger fiber diameter into a network shape, and the mesh form is the form of the network formed in the above weaving manner. Examples of the mesh form include forms that are generally referred to as plain weave, twill weave, tatami weave, and twill tatami weave, but are not particularly limited as long as the mesh form can achieve an object of the present invention. From the viewpoints of versatility and the like, a form that is referred to as "plain weave" is preferable. In the present application, the form that is referred to as plain weave is a form obtained by alternately crossing longitudinal fibers and lateral fibers one by one. Each adjacent distance between the crossed resin fibers (that is, "each adjacent distance between the resin fibers having a smaller fiber diameter" and "each adjacent distance between the resin fibers having a larger fiber diameter") is preferably equal.

In the two kinds of resin fibers having different fiber diameters described above, the kind of the resin that is the material of the resin fibers having a smaller fiber diameter and the kind of the resin that is the material of the resin fiber having a larger fiber diameter may be the same or different each other. Also, resin fibers obtained by combining resins of which the materials are different and of which the diameters are the same may be used. As an example of resin fibers obtained by combining resins of which the materials are different, each resin fiber constituting resin fibers used as the resin fibers having a smaller fiber diameter may be a resin fiber obtained by the following: providing a resin fiber of which the material is different from the material to be used as the resin fibers having a smaller fiber diameter; making its fiber diameter the same as the fiber diameter of the resins fiber having a smaller fiber diameter; and by connecting it to each resin fiber constituting the resin fibers having a smaller fiber diameter.

The oxygen channel for air cells only needs to be a structural body including two kinds of resin fibers in a mesh form wherein the two kinds of resin fibers have the above different diameters each other as described above. Thus, another structure may be included therein as long as an object of the present invention can be achieved. For example, a structural body further including a conductive substance may be also used. Specifically, there is a case where the above resin fibers are coated with a conductive substance by means of a plating treatment or the like.

The thickness of the above structural body is preferably in a range of from 50 μm or more to 300 μm or less, and more preferably in a range of from 100 μm or more to 200 μm or less.

Figure 2:
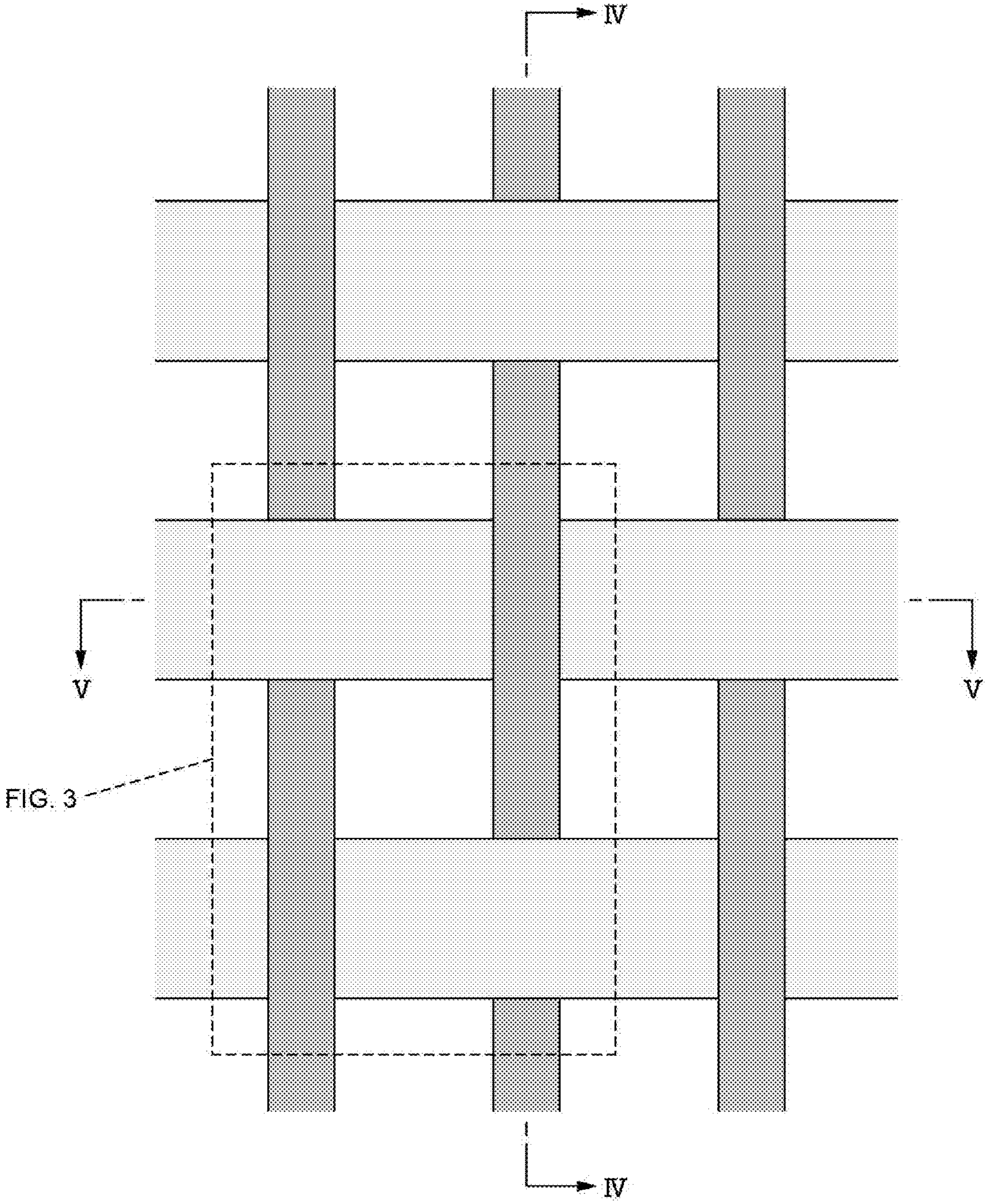
FIG. 2 is a plane view of an oxygen channel for air cells that is one embodiment of the present invention, and in the plane view, one portion of the oxygen channel for air cells is enlarged.
Figure 4:
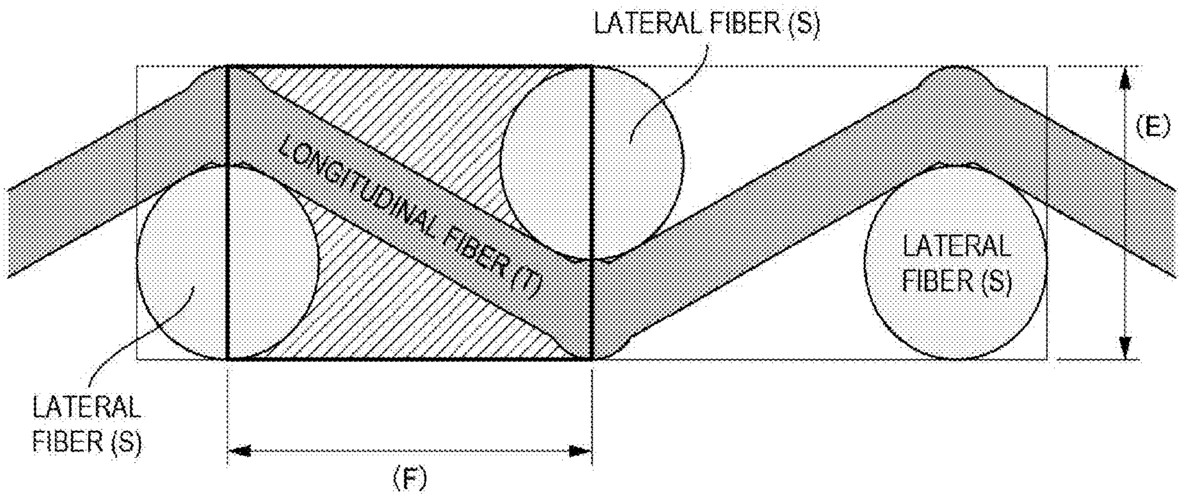
FIG. 4 is a view of an oxygen channel for air cells that is one embodiment of the present invention, when being viewed from a cross-sectional direction of the oxygen channel for air cells (that is, "cross-sectional view"), and in this view, one portion of the oxygen channel for air cells is enlarged.

FIG. 1 is a perspective view illustrating an example of an oxygen channel for air cells (specifically; structural body including, in a mesh form (specifically, form that is referred to as plain weave), two kinds of resin fibers having different fiber diameters in which the ratio of (larger fiber diameter/smaller fiber diameter) is in a range of from 1.2 to 7). As shown in FIG. 1, the longitudinal resin fibers having a smaller fiber diameter and the lateral resin fibers having a larger fiber diameter are alternately crossed one by one to form cross-stripes. In the present application, a face viewed from a direction in which the cross-stripes are seen in a plane is a plane of the structural body (that is, plane of the oxygen channel for air cells), and FIG. 2 shows an enlarged view of one portion thereof. That is, the plane of the above structural body is a face of the oxygen channel for air cells viewed from directly above, and a face viewed from a direction in which the cross-stripes due to crossing of the two kinds of resin fibers are seen as a plane. The cross section of the structural body is a face of a cut opening, as viewed from the side, obtained by cutting the structural body in a vertical direction, and is a face perpendicular to the plane of the structural body. That is, the cross section of the structural body is a face of the oxygen channel for air cells viewed from right beside (that is, side face), and is a face viewed from the cross-sectional direction of the two kinds of resin fibers. FIG. 4 is an enlarged view of one portion thereof.

The ratio of an opening area per unit area in the plane (i.e., “planar opening ratio”) of the above structural body is 50% or more, and preferably 60% or more.

The ratio of an opening area per unit area in the cross section (i.e., “cross-sectional opening ratio”) of the above structural body is 50% or more, and preferably 60% or more.

The method known as a measurement of the opening ratio (specifically, the ratio of void portions) of a structural body formed of a porous metal body of aluminum (Al) or the like is as follows: the structural body is filled with a resin, and then polished to obtain a cross section; the obtained cross section is observed with a digital microscope; and the opening ratio is calculated.

However, this method cannot be used as a method of calculating the opening ratio (that is, “planar opening ratio” and “cross-sectional opening ratio”) of such a structural body including resin fibers in a mesh form as in the present invention. In a case where the cross-sectional opening ratio in a structural body including the resin fibers in a mesh form is calculated using such a method, the structural body needs to be filled with a resin, and then polished to obtain a cross section so that the cross section can always pass through the centers of the lateral fibers as shown in FIG. 4. However, oblique polishing with only slight deviation deviates the cross section from the centers, and thus the lateral fiber diameters seen in FIG. 4 become small or invisible. Therefore, the above method is inappropriate as a method of evaluating the opening ratio of a structural body including the resin fibers in a mesh form and cannot be used. For these reasons, in the present invention, preferred is a method of calculating the opening ratio in accordance with the following calculation formulas. However, the present invention is not particularly limited to this method as long as the opening ratio can be evaluated similarly to the values calculated by the following calculation formulas.

[Mathematical 3]

$$\text{“Planar opening ratio (\%)”} = \frac{A \times B}{C \times D} \times 100 \qquad \text{(Formula 1)}$$

(In Formula 1, “A” represents a lateral length of an opening portion and is defined by a formula described below:

“$A$”=“1/density of resin fibers having a smaller fiber diameter (fibers/mm)”−“a fiber diameter of one resin fiber having a smaller fiber diameter (μm)/1000 (μm/mm)”, “B” represents a longitudinal length of the opening portion and is defined by a formula described below:

“$B$”=“1/density of resin fibers having a larger fiber diameter (fibers/mm)”−“a fiber diameter of one resin fiber having a larger fiber diameter (μm)/1000 (μm/mm)”, “C” represents an adjacent distance between the resin fibers having a smaller fiber diameter and is defined by a formula described below:

“$C$”=“1/density of resin fibers having a smaller fiber diameter (fibers/mm)”,

“D” represents an adjacent distance between the resin fibers having a larger fiber diameter and is defined by a formula described below:

“$D$”=“1/density of resin fibers having a larger fiber diameter (fibers/mm)”.)

[Mathematical 2]

$$\text{“Cross-sectional opening ratio (\%)”} = \frac{E \times F - (S + T)}{E \times F} \times 100 \qquad \text{(Formula 2)}$$

(In Formula 2, “E” represents a height of a unit cross-sectional area and is defined by a formula described below:

“$E$”=“a fiber diameter of one resin fiber having a larger fiber diameter (μm)/1000 (μm/mm)”+“a fiber diameter of one resin fiber having a smaller fiber diameter (μm)/1000 (μm/mm)”, "F" represents a lateral length of the unit cross-sectional area and is defined by a formula described below:

"*F*"="1/density of resin fibers having a larger fiber diameter (fibers/mm)",

"S" represents an area of resin fibers having a larger fiber diameter in the unit cross-sectional area, and is defined by a formula described below:

"*S*"=("a fiber diameter of one resin fiber having a larger fiber diameter (μm)/1000 (μm/mm)"/2)$^2$× 3.14, "T" represents an area of a resin fiber having a smaller fiber diameter in the unit cross-sectional area, and is defined by a formula described below:

"*T*"="a fiber diameter of resin fibers having a smaller fiber diameter (μm)/1000 (μm/mm)"×"1/density of resin fibers having a larger fiber diameter (fibers/mm)".)

The method of calculating the planar opening ratio (%) and the cross-sectional opening ratio (%) will be described in detail below with reference to FIGS. 3 and 4 as appropriate.

FIG. 3 is an enlarged view of cross-stripes portion per unit viewed from a planar direction of the oxygen channel for air cells. As shown in FIG. 3, the cross-stripes portion per unit has a structure in which longitudinal resin fibers having a smaller fiber diameter and lateral resin fibers having a larger fiber diameter are alternately crossed one by one, and two longitudinal resin fibers having a smaller fiber diameter and two lateral resin fibers having a larger fiber diameter form one unit of cross-stripes. The longitudinal resin fibers having a smaller fiber diameter (that is, "resin fibers having a smaller fiber diameter") are arranged so that each adjacent distance between them is equal, and the lateral resin fibers having a larger fiber diameter (that is, "resin fibers having a larger diameter") are also arranged so that each adjacent distance between them is equal. Here, for convenience, the longitudinal resin fibers having a smaller fiber diameter (i.e., the resin fibers having a smaller fiber diameter) are referred to as "longitudinal fibers", a density thereof (i.e., density of the resin fibers having a smaller fiber diameter) is referred to as "longitudinal fiber density", the lateral resin fibers having a larger fiber diameter (i.e., the resin fibers having a larger fiber diameter) are referred to as "lateral fibers", and a density thereof (i.e., a density of the resin fibers having a larger fiber diameter) is referred to as "lateral fiber density".

FIG. 4 is a view of the oxygen channel for air cells, viewed from a cross-sectional direction, specifically, a view when a face obtained by cutting the portion surrounded by the dashed line in FIG. 2, which corresponds to FIG. 3, in the IV-IV direction vertically is viewed from right beside. The portion surrounded by the thick line frame in FIG. 4 corresponds to the portion surrounded by the thick line frame in FIG. 3.

(1) Method of Calculating Planar Opening Ratio (%)

The planar opening ratio (%) is the ratio of an opening area per unit area in the plane (that is, "unit planar area") of the oxygen channel for air cells. According to FIG. 3, the planar opening ratio is the ratio (%) of the opening area to the area of the portion surrounded by the thick line frame.

In FIG. 3, "A" represents the lateral length of the opening portion (mm), "B" represents the longitudinal length of the opening portion (mm), "C" represents an adjacent distance between the longitudinal fibers (, which is also referred to as "lateral pitch" in the present application), and "D" represents an adjacent between the lateral fibers (, which is also referred to as "longitudinal pitch" in the present application). Here, the fiber diameter of one longitudinal fiber (μm), the fiber diameter of one lateral fiber (μm), the longitudinal fiber density (fibers/mm), and the lateral fiber density (fibers/mm) are known values.

The lateral length of the opening portion represented by "A" is one obtained by subtracting the fiber diameter of one longitudinal fiber from the lateral pitch.

Here, "C" is obtained as follows: "lateral pitch (mm)"="1/longitudinal fiber density (fibers/mm)".

Also, the fiber diameter of one longitudinal fiber (μm) expressed in unit of "mm" is "the fiber diameter of one longitudinal fiber (μm)/1000 (μm/mm)".

Then, the lateral length of the opening portion (A) is calculated from the following formula.

[Mathematical 5]

$$\text{“}A\text{: Lateral length of opening portion (mm)”} = \text{“}C\text{: lateral pitch (mm)”} - \text{“fiber diameter of one longitudinal fiber (mm)”} = \text{“1/longitudinal fiber density (fibers/}m-m\text{)”} - \text{“}\textit{fiber density of one longitudinal fiber}\text{ (}\mu\text{m)/1000 (}\mu\text{m, mm)”}$$

Similarly, "*B*: the longitudinal length of the opening portion (mm)" is calculated from the following formula.

[Mathematical 6]

$$\text{“}B\text{: Longitudinal length of opening portion (mm)”} = \text{“}D\text{: longitudinal pitch”} - \text{“fiber diameter of one lateral fiber”} = \text{“1/lateral fiber density (fibers/mm)”} - \text{“fiber diameter of one lateral fiber (}\mu\text{m)/(}\mu\text{m/mm)”}$$

Then, since the planar opening ratio (%) is the ratio of an opening area per unit area in the plane of the oxygen channel for air cells, this is calculated from the following formula.

[Mathematical 7]

$$\text{“}\textit{Planar opening ratio}\text{ (\%)”} = \frac{A \times B}{C \times D} \times 100 \quad \text{(Formula 3)}$$

(In Formula 3, "A" represents the lateral length of an opening portion and is defined by the following formula:

"*A*"="1/longitudinal fiber density (fibers/mm)"−"fiber diameter of one longitudinal fiber (μm)/1000 (μm/mm)", "B" represents the longitudinal length of the opening portion and is defined by the following formula:

"*B*"="1/lateral fiber density (fibers/mm)"−"fiber diameter of one lateral fiber (μm)/1000 (μm/mm)", "C" represents an adjacent between the longitudinal fibers (c) and is defined by the following formula:

"*C*"="1/density of longitudinal fibers (fibers/mm)",

"D" represents an adjacent between the lateral fibers (longitudinal pitch) and is defined by the following formula:

"*D*"="1/density of lateral fibers (fibers/mm)".)

"Formula 3" corresponds to "Formula 1" described above.

(2) Method of Calculating Cross-Sectional Opening Ratio (%)

The cross-sectional opening ratio (%) is the ratio of an opening area per unit area in the cross section (that is, "unit cross-sectional area") of the oxygen channel for air cells. According to FIG. 4, the area of the portion surrounded by the thick line frame corresponds to the unit cross-sectional area, and thus the cross-sectional opening ratio (%) is the ratio (%) of the opening area (that is, "hatched portion") to the area of the portion surrounded by the thick line frame.

"E" and "F" shown in FIG. 4 respectively indicate the height and the lateral length of the portion surrounded by the thick line frame.

Here, the fiber diameter of one longitudinal fiber (μm), the fiber diameter of one lateral fiber (μm), the longitudinal fiber density (fibers/mm), and the lateral fiber density (fibers/mm) are known values.

The height (E) of the portion surrounded by the thick line frame (i.e., "height of the unit cross-sectional area") in FIG. 4 is obtained by adding the fiber diameter of one lateral fiber (μm) to the fiber diameter of one longitudinal fiber (μm), and thus in a case of expressing this in unit of "mm", the value is calculated from the following formula.

[Mathematical 8]

$$\text{“}E\text{: Height of unit cross-sectional area (mm)”} = \text{“fiber diameter of one lateral fiber }(\mu\text{m})/1000\ (\mu\text{m/mm})\text{”} + \text{“fiber diameter of one longitudinal fiber }(\mu\text{m/mm})\text{”}$$

Also, the lateral length (F) of the portion surrounded by the thick line frame (i.e., "lateral length of the unit cross-sectional area") in FIG. 4 corresponds to an adjacent between the lateral fibers (longitudinal pitch (D)), and thus is calculated from the following formula.

[Mathematical 9]

$$\text{“}F\text{: Lateral length of unit cross-sectional area (mm)”} = (\text{“longitudinal pitch }(D)\text{”}) = \text{“1/lateral fiber density (fibers/mm)”}$$

The area of the lateral fibers ($mm^2$) in the portion surrounded by the thick line frame (i.e., "the area of the lateral fibers ($mm^2$) in the unit cross-sectional area") in FIG. 4 corresponds to the cross-sectional area of the lateral fiber, and thus the cross-sectional area represented by "S" in the figure is calculated from the following formula.

[Mathematical 10]

$$\text{“}S\text{: Area of lateral fibers in unit cross-sectional area }(\text{mm}^2)\text{”} = (\text{“fiber diameter of one lateral fiber }(\mu\text{m})/(\mu\text{m/mm})\text{”}/2)^2 \times 3.14 \quad \text{(Formula a)}$$

The area of the longitudinal fiber ($mm^2$) in the portion surrounded by the thick line frame (i.e., "the area of the longitudinal fibers ($mm^2$) in unit cross-sectional area") in FIG. 4 corresponds to the product of "the fiber diameter of one longitudinal fiber (μm)" and "F: lateral length of the unit cross-sectional area (mm)", and thus the area represented by "T" is calculated from the following formula.

[Mathematical 11]

$$\text{“}T\text{: Area of longitudinal fiber in unit cross-sectional area }(\text{mm}^2)\text{”} = \text{“(fiber diameter of one longitudinal fiber }(\mu\text{m})/1000\ (\mu\text{m/mm})\text{”} \times \text{“1/lateral fiber density (fibers/mm)”} \quad \text{(Formula b)}$$

Then, since the cross-sectional opening ratio (%) is the ratio of an opening area per unit cross-sectional area in the cross section of the oxygen channel for air cells, this is calculated from the following formula.

[Mathematical 12]

$$\text{“Cross-sectional opening ratio (\%)”} = \frac{E \times F - (S + T)}{E \times F} \times 100 \quad \text{(Formula 4)}$$

(In Formula 4, "E" represents the height of the unit cross-sectional area and is defined by the following formula:

$$\text{“}E\text{”=“fiber diameter of one lateral fiber (μm)/1000 (μm/mm)”+“fiber diameter of one longitudinal fiber (μm)/1000 (μm/mm)”},$$

"F" represents the lateral length of the unit cross-sectional area and is defined by the following formula:

$$\text{“}F\text{”=“1/density of lateral fibers (fibers/mm)”},$$

"S" represents the area of lateral fibers in the unit cross-sectional area, and is defined by the following formula:

$$\text{“}S\text{”=(“fiber diameter of one lateral fiber (μm)/1000 (μm/mm)”/2)}^2 \times 3.14,$$

"T" represents the area of a longitudinal fiber in the unit cross-sectional area, and is defined by the following formula:

$$\text{“}T\text{”=“fiber diameter of longitudinal fiber (μm)/1000 (μm/mm)”×“1/density of lateral fibers (fibers/mm)”.)}$$

"Formula 4" corresponds to "Formula 2" described above.

It is noted that the longitudinal fibers and the lateral fibers in "Formula 4" are interchanged in the case where a face obtained by cutting the portion surrounded by the dashed line in FIG. 2, which corresponds to FIG. 3, in the V-V direction vertically is viewed from right beside. Therefore, the area of the lateral fibers ($mm^2$) and the area of the longitudinal fiber ($mm^2$) in the portion surrounded by the thick line frame (i.e., "unit cross-sectional area") in FIG. 4 are replaced with the area of the longitudinal fibers ($mm^2$) and the area of the lateral fiber ($mm^2$), respectively.

That is, "Formula a" and "Formula b" described above are replaced with "Formula a" and "Formula b" described below, respectively.

[Mathematical 13]

$$\text{“Area of longitudinal fibers in unit area }(\text{mm}^2)\text{”} = (\text{“fiber diameter of one longitudinal fiber }(\mu\text{m})/1000\ (\mu\text{m/mm})\text{”}/2)^2 \times 3.14 \quad \text{(Formula a')}$$

-continued

[Mathematical 14]

$$\text{“Area of lateral fiber in unit area }(\text{mm}^2)\text{”} = \text{“fiber diameter of one lateral fiber }(\mu\text{m})/1000\ (\mu\text{m/mm})\text{”} \times \text{“1/longitudinal fiber density (fiber/mm)”} \quad \text{(Formula b')}$$

As described above, a difference in the cross-sectional opening ratio depending on the orientation of the cross section (specifically, anisotropy) is recognized, but in the present application, the opening ratio of a face from the direction in which the fiber diameter of the resin fibers having a larger fiber diameter (that is, circular cross section) appears as shown in FIG. 4 is evaluated as the cross-sectional opening ratio. Specifically, the opening ratio evaluated as the cross-sectional opening ratio is the opening ratio of a cross section when a face obtained by cutting the portion surrounded by the dashed line in FIG. 2, which corresponds to FIG. 3, in the IV-IV direction vertically is viewed from right beside.

The area density of the oxygen channel for air cells is preferably small in consideration of realization of an air cell having a high gravimetric energy density. Specifically, the area density is preferably 10 mg/cm$^2$ or less, and particularly preferably 4.0 mg/cm$^2$ or less.

The two kinds of resin fibers having different fiber diameters constituting the oxygen channel for air cells may be coated with a conductive substance. The above conductive substance is not particularly limited as long as it exhibits conductivity, and is preferably at least one metal selected from the group consisting of copper (Cu), tungsten (W), aluminum (Al), nickel (Ni), titanium (Ti), gold (Au), silver (Ag), platinum (Pt), and palladium (Pd) or an alloy containing the at least one metal.

In this case, the oxygen channel for air cells has the property as a conductive property, and thus the oxygen channel may be used as a collector (i.e., "oxygen channel and collector"). As a result, the oxygen channel and the collector constituting the air cell can be integrated, and thus it is easily realized to make the air cell smaller.

In a case where an air cell separately includes an oxygen channel and a collector that constitute a positive electrode, the air cell includes a negative electrode, a separator filled with a non-aqueous electrolytic solution, and a positive electrode, and the positive electrode includes a positive electrode layer, the above oxygen channel for intake of oxygen as an active material, and the collector.

Also, in a case of an air cell in which a collector constituting a positive electrode is an oxygen channel and collector, the air cell includes a negative electrode, a separator filled with a non-aqueous electrolytic solution, and a positive electrode, and the positive electrode includes a positive electrode layer, the collector including an oxygen channel for intake of oxygen as an active material (that is, oxygen channel and collector), and a positive electrode lead.

The negative electrode, the non-aqueous electrolytic solution, the separator, and the positive electrode, which constitute the air cell are as described below:

Examples of the air cell of the present invention include lithium-air cells, magnesium-air cells, sodium-air cells, and aluminum-air cells. Here, the structure of the lithium-air cell according to the present invention will be exemplarily described with reference to FIG. 5. However, the air cell according to the present invention is not limited to an aspect exemplified below: Those not otherwise specified in the present application are not particularly limited as long as an object of the present invention can be achieved.

[Structure of Lithium-Air Cell]

First, the structure of a lithium-air cell 100 will be described.

Figure 5:
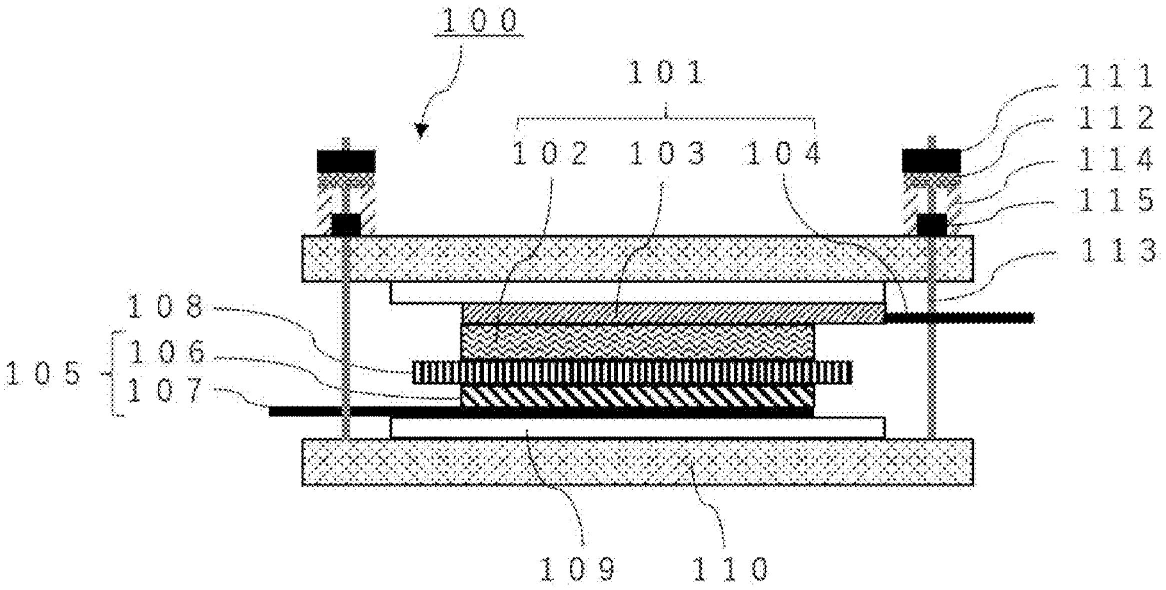
FIG. 5 is a schematic cross-sectional view showing a structure of a lithium-air cell that is one embodiment of the present invention.

FIG. 5 is a schematic cross-sectional view showing a structure of a lithium-air cell of an embodiment of the present invention.

The lithium-air cell 100 includes a laminated structural body in which a positive electrode 101 and a negative electrode 105 are stacked with a separator 108 interposed therebetween. And, the laminated structural body is restrained by glass plates 109 and stainless steel plates 110 via springs 114.

The positive electrode 101 is constituted by a positive electrode layer 102, an oxygen channel and collector (i.e., oxygen channel and positive electrode collector) 103, and a positive electrode lead 104. The oxygen channel and collector 103 has a function as an oxygen channel permeable to oxygen and a function as a collector (specifically, positive electrode collector). The oxygen channel and collector 103 may have a function as an oxygen channel and a function as a collector separately. That is, in the oxygen channel and collector 103, an oxygen channel and a collector (specifically; positive electrode collector) may be independently provided.

In the present invention, a mesh-formed structural body (that is also referred to as "conductive mesh-formed structural body having different diameters" in the present application) constituted by applying a conductive treatment to a mesh formed of two kinds of resin fibers having different fiber diameters is used as the oxygen channel and collector 103. The conductive treatment only needs to be a treatment in which conductivity can be given to the above resin fibers, and general examples of the conductive treatment include a treatment in which the resin fibers are plated and coated with a metal or alloy to form a conductive layer of the metal or alloy. Here, the metal or alloy to be plated is not particularly limited as long as it exhibits conductivity, and is preferably at least one metal selected from the group consisting of copper (Cu), tungsten (W), aluminum (Al), nickel (Ni), titanium (Ti), gold (Au), silver (Ag), platinum (Pt), and palladium (Pd) or an alloy containing the at least one metal.

The positive electrode layer 102 has conductivity and is a reaction field in which lithium peroxide generated by a discharge reaction is precipitated, and thus the positive electrode layer 102 needs to have a porous structure. In the positive electrode layer 102, a material such as carbon, a metal, a carbide, or an oxide is used, and carbon is preferable.

As the negative electrode 105, a generally known negative electrode can be used. Examples of the negative electrode 105 include a structural body constituted by the following: a negative electrode collector 107; and a negative electrode active material layer 106 that is provided on the negative electrode collector 107 and contains a metal or alloy capable of occluding and releasing lithium. Representative materials of the negative electrode active material layer 106 include materials made of a lithium metal. As the negative electrode collector 107, for example, a copper foil can be used.

The separator 108 is disposed between the positive electrode 101 and the negative electrode 105. As the separator 108, an insulating material is used wherein the insulating material is permeable to lithium ions, has a porous structure, and is an organic material having no reactivity with the positive electrode layer 102, the negative electrode active material layer 106, and an electrolytic solution. The separator 108 also serves to retain the electrolytic solution. Thus, examples of the separator 108 include thermally meltable microporous films made of a polyolefin resin, for example, a polyethylene microporous film. The separator 108 is preferably used in a size larger than that of the positive electrode layer 102 and the negative electrode active material layer 106 in order to avoid a short circuit between the positive electrode layer 102 and the negative electrode active material layer 106.

As the electrolytic solution, any non-aqueous electrolytic solutions containing a lithium metal salt are preferable.

In the case of using a lithium salt as the lithium metal salt in the non-aqueous electrolytic solution, examples of the lithium salt include $LiPF_6$, $LiBF_4$, $LiSbF_6$, $LiSiF_6$, $LiAsF_6$, $LiN(SO_2C_2F_5)_2$, $Li(FSO_2)_2N$, $LiCF_3SO_3$(LiTfO), $Li(CF_3SO_2)_2N$(LiTFSI), $LiC_4F_9SO_3$, $LiClO_4$, $LiAlO_2$, $LiAlCl_4$, and $LiB(C_2O_4)_2$. In the case of a lithium-air cell, an electrolytic solution containing LiBr as the lithium salt is particularly preferable.

In the non-aqueous electrolytic solution, the non-aqueous solvent is selected from, but not limited to, the group consisting of glymes (monoglymes, diglymes, triglymes, and tetraglymes), methyl butyl ether, diethyl ether, ethyl butyl ether, dibutyl ether, polyethylene glycol dimethyl ether, tetraethylene glycol dimethyl ether, cyclohexanone, dioxane, dimethoxyethane, 2-methyltetrahydrofuran, 2,2-dimethyltetrahydrofuran, 2,5-dimethyltetrahydrofuran, tetrahydrofuran, methyl acetate, ethyl acetate, n-propyl acetate, dimethyl acetate, methyl propionate, ethyl propionate, methyl formate, ethyl formate, dimethyl carbonate, diethyl carbonate, ethyl methyl carbonate, dipropyl carbonate, methyl propyl carbonate, ethyl propyl carbonate, ethylene carbonate, propylene carbonate, butylene carbonate, polyethylene carbonate, γ-butyrolactone, decanolide, valerolactone, mevalonolactone, caprolactone, acetonitrile, benzonitrile, nitromethane, nitrobenzene, triethylamine, triphenylamine, tetraethylene glycol diamine, dimethylformamide, diethylformamide, N-methylpyrrolidone, dimethylsulfone, tetramethylene sulfone, triethylphosphine oxide, 1,3-dioxolane, and sulfolane. These solvents may be used singly, or may be used in combination of two or more kinds thereof.

The lithium-air cell 100 shown in FIG. 5 is a lithium-air cell in which the positive electrode layer 102 and the negative electrode active material layer 106 are square, and the lithium-air cell 100 includes the glass plates 109, the stainless steel plates 110, fixing screws 111, fixing washers 112, struts 113, the springs 114, and spacers 115.

Four corner portions of the lower stainless steel plate 110 are previously joined to the four columnar struts 113. The upper stainless steel plate has holes, at positions relative to the struts 113, through which the struts 113 pass.

The positive electrode 101, the separator 108, the negative electrode 105, and the two glass plates are sandwiched between the stainless steel plates 110 from above and below. At this time, the stainless steel plates 110 are used to sandwich them by passing the struts 113 through the holes in the four corner portions of the upper stainless steel plate 110. The struts 113 protruded from the holes by passing through the holes of the upper stainless steel plate are passed through the spacers 115, the springs 114, and the fixing washers 112. The struts 113 are threaded and fixed with the fixing screws 111. The pressure applied between the stainless steel plates 110 can be controlled by the degree of tightening of the fixing screws 111.

The glass plates 109 function as insulators that avoid a short circuit between the positive electrode 101 and the negative electrode 105 through the stainless steel plates 110 and the struts 113.

[Method for Manufacturing Lithium-Air Cell]

Next, a method for manufacturing the lithium-air cell 100 will be described.

First, a method for manufacturing a porous positive electrode as the positive electrode layer 102 will be described.

First, 50 wt % to 80 wt % of porous carbon particles, 1 wt % to 15 wt % of carbon fibers, and 5 wt % to 49 wt % of a binding polymer material are weighed out, and a solvent made of N-methylpyrrolidone capable of dispersing these materials uniformly is used to prepare a paint for a positive electrode of a carbon porous body.

Here, as the porous carbon particles, carbon black containing KETJENBLACK (registered trademark), and in addition, for example, carbon particles formed by means of a template method can be used.

As the carbon fibers, carbon fibers having a fiber diameter of 0.1 μm or more and 20 μm or less and a length of 1 mm or more and 20 mm or less can be used.

Examples of the binding polymer material include polyacrylonitrile (PAN) and polyvinylidene fluoride, and examples of the solvent include dimethylsulfoxide (DMSO), dimethylformamide (DMF), and dimethylacetamide (DMA).

The method of forming a sheet is not particularly limited, and examples of the method include a wet film-forming method using a well-known doctor blade or the like. In addition, examples of the method include a roll coater method, a die coater method, a spin coating method, and a spray coating method. As for forms after being formed, various forms can be made according to the purpose.

In the next step of immersion in a solvent, the sample (specifically, sheet) formed using the above method of forming a sheet is immersed in a solvent having a low solubility for the binding polymer material according to a non-solvent induced phase separation method. Through this step, a porous film is formed. Examples of the solvent include water, alcohols such as ethyl alcohol, methyl alcohol, and isopropyl alcohol, and mixed solvents thereof.

Next, drying is performed. In this drying step, various solvents are volatilized from the sample. Examples of the drying method include a method of placing under a dry air environment, a method of drying under reduced pressure, and a vacuum drying method. In this drying step, heating may be performed at a temperature higher than the boiling point of the solvent in order to increase the drying speed.

Thereafter, a firing treatment is performed. The firing treatment can be performed using, for example, an oven furnace or an infrared radiation furnace. In the firing step, a single heat treatment may be also performed, or a two-stage heat treatment including infusibilization and firing may be also performed. The heat treatment temperature in firing is preferably 800° C. or more and 1400° C. or less, and the atmosphere at this time is preferably an inert atmosphere with an argon (Ar) gas, a nitrogen ($N_2$) gas, or the like.

For example, in the case of using PAN as the binding polymer, it is preferable to perform a heat treatment for infusibilization in the air at about 300° C. and then perform a heat treatment at 800° C. or more and 1400° C. or less in an inert atmosphere with an Ar gas, an $N_2$ gas, or the like.

Through the above steps, the positive electrode layer 102 having a mechanical strength that is sufficient and practical for self-standing is manufactured. This structural body has a high air permeability; a high ion transport efficiency, and a wide reaction field, in addition to a self-standing property.

The negative electrode 105 is manufactured and prepared, for example, as follows.

On the negative electrode collector 107 cut into a rectangular shape, the square negative electrode active material layer (i.e., metal layer) 106 that has the same length as the short side of the negative electrode collector 107 as well as that is made of a lithium metal or the like is prepared, the negative electrode collector 107 and the negative electrode active material layer 106 are stacked so that the negative electrode active material layer 106 overlaps the negative electrode collector 107, thereby obtaining the negative electrode 105.

The separator 108 is disposed on the negative electrode active material layer 106 and filled with a predetermined amount of the non-aqueous electrolytic solution. Furthermore, the positive electrode layer 102 is disposed on the separator 108 to overlap the separator 108 so that the centers of their squares coincide, and the positive electrode layer 102 is filled with a predetermined amount of the non-aqueous electrolytic solution.

Finally, the oxygen channel and collector 103 to which the positive electrode lead 104 is previously attached and the positive electrode layer 102 are stacked so that three sides of the positive electrode layer 102 overlap three sides of the oxygen channel and collector 103. At this time, one side attaching the positive electrode lead 104 that does not overlap the positive electrode layer 102 preferably extends to the direction opposite to the direction to which the negative electrode collector 107 extends, in order to avoid a short circuit between the positive electrode and the negative electrode.

A laminated body formed of the positive electrode 101, the negative electrode 105, and the separator 108 is sandwiched between the glass plates 109 and the stainless steel plates 110. The struts 113 fixed to the four corner portions of the lower stainless steel plate 110 are protruded through the holes at the four corner portions of the upper stainless steel plate 110, restrained by interposing the spacers 115 and the springs 114, and fixed by the fixing washers 112 and the fixing screws 111. At this time, the fixing screws 111 are used for adjustment to apply a pressure of 13 to 14 $N/cm^2$ to the positive electrode 101, the negative electrode 105, and the separator 108.

Through the above steps, the lithium-air cell 100 is obtained. Here, the lithium-air cell is preferably assembled in dry air, for example, dry air having a dew point temperature of −50° C. or less. Through the above steps, the lithium-air cell 100 is manufactured.

EXAMPLES

Hereinafter, one embodiment of the present invention will be specifically described. It is noted that the reference signs correspond to the reference signs shown in FIG. 5. Those not otherwise specified in the present application are not particularly limited as long as an object of the present invention can be achieved. It is noted that the present invention is not limited, in any sense, by the following Examples.

Example 1

Positive Electrode 101

A synthetic paint was prepared using 65 wt % of porous carbon particles, 10 wt % of carbon fibers, 25 wt % of a binding polymer material, and a solvent that disperses these materials uniformly and is made of N-methylpyrrolidone and dimethylsulfoxide (DMSO).

Here, as the porous carbon particles, carbon black containing 65 wt % of KETJENBLACK (registered trademark) was used.

As the carbon fibers, carbon fibers having an average fiber diameter of 7 mm and an average length of 3 mm were used.

As the binding polymer material, polyacrylonitrile (PAN) was used.

PAN was previously dissolved in a DMSO solvent so that the content of PAN was 10 wt %, thereby producing a PAN solution. The carbon fibers and the PAN solution were weighed out so that the weight ratio between “the carbon fibers” and “the PAN contained in the PAN solution” was 10:25, and mixed using a “planetary centrifugal mixer “THINKY MIXER”” (ARE-310, manufactured by THINKY CORPORATION, which is hereinafter referred to as “THINKY MIXER”) at 2000 rpm for 2 minutes. Subsequently, the porous carbon particles were weighed out so that the amount of the porous carbon particles became 65 wt % when the amount of the carbon fibers was 10 wt %, the porous carbon particles were added to the above paint, and the resulting paint was diluted using N-methylpyrrolidone so that the Ny value (ratio (%) of the mass of the paint after drying to the mass of the paint before drying (that is, mass of the paint after drying)/(mass of the paint before drying)×100) was 11%. This paint was mixed again using a THINKY MIXER at 2000 rpm for 2 minutes to prepare a paint for a positive electrode.

The paint for a positive electrode was formed into a sheet having a uniform thickness using a wet film-forming method with a doctor blade. After forming the sheet, the formed sample was immersed in methanol (i.e., poor solvent) according to a non-solvent induced phase separation method, and formed into a porous film.

In order to remove a volatile solvent from the sheet-shaped sample, a drying step was performed at 50 to 80° C. for 10 hours or more, and subsequently a heat treatment for infusibilization was performed at 280° C. for 3 hours in the air. Then, firing was performed at 1050° C. for 3 hours in a firing furnace under a nitrogen gas atmosphere after vacuum replacement to produce a carbon porous body sample having a length of 140 mm, a width of 100 mm, and a thickness of 300 μm.

The carbon porous body was cut into a form of 20 mm square to obtain a positive electrode layer 102.

As an oxygen channel and collector 103 constituting a positive electrode, a mesh-formed structural body using conductive resin fibers as a base material was used. Specifically, polyester fibers having, as longitudinal fibers, a fiber diameter (that is also referred to as “longitudinal fiber diameter” in the present application) of 27 μm and polyester fibers having, as lateral fibers, a fiber diameter (that is also referred to as “lateral fiber diameter” in the present application) of 100 μm were used, thereby producing a mesh-formed structural body (i.e., conductive mesh-formed structural body having different diameters) constituted by a structure that the mesh formed of the longitudinal fibers having a density (that is so called “longitudinal fiber density) of 130 fibers/inch (=5.1 fibers/mm) and the lateral fibers having a density (that is so” called “lateral fiber density”) of 50 fibers/inch (=2.0 fibers/mm) was plated with copper and nickel. The produced mesh-formed structural body was used as the oxygen channel and collector 103.

The area density was calculated by dividing the weight (unit: mg) of the oxygen channel and collector 103 by the area (unit: $cm^2$) of the oxygen channel and collector viewed from the planar direction.

The planar opening ratio and the cross-sectional opening ratio were calculated with the above-described calculation method.

In Example 1 of the present application, the thickness was calculated as the sum of the longitudinal fiber diameter and the lateral fiber diameter.

In the oxygen channel and collector 103 used in Example 1 of the present application, the area density, the planar opening ratio, and the cross-sectional opening ratio thereof were 3.5 $mg/cm^2$, 69%, and 67%, respectively. The thickness was 127 μm.

The oxygen channel and collector 103 was cut into a size of 25 mm×20 mm, a positive electrode lead 104 was attached thereto, and the resulting product was used as a positive electrode 101.

Negative Electrode 105

As a negative electrode collector 107, a copper foil having a thickness of 12 μm cut into a form of 60 mm×20 mm was used. As a negative electrode active material layer 106, a lithium foil having a thickness of 100 μm cut into a form of 20 mm×20 mm was used. Then, the cut out lithium foil of 20 mm square was bonded to the negative electrode collector 107 so that three sides of the lithium foil overlapped three sides of the negative electrode collector 107 to obtain a negative electrode 105.

Non-Aqueous Electrolytic Solution

A non-aqueous electrolytic solution was obtained by dissolving, in a tetraglyme (TEGDME) solvent, three kinds of electrolytes, that is, 0.5 mol/L of $Li(CF_3SO_2)_2N$(LiTFSI), 0.5 mol/L of $LiNO_3$, and 0.2 mol/L of LiBr.

Separator 108

As the separator 108, a polyethylene microporous film (thickness: 20 μm) manufactured by W-SCOPE Corporation was cut into a 22 mm square and used.

Air Cell (Lithium-Air Cell) 100

A lithium-air cell 100 was produced (i.e., assembled) in dry air having a dew point temperature of −50° C. or less.

The separator 108 was disposed on the negative electrode active material layer 106 of the negative electrode 105, and filled with 15 μL (3.75 $\mu L/cm^2$) of the non-aqueous electrolytic solution.

Furthermore, the positive electrode layer 102 was disposed on the separator 108 to overlap the separator 108 so that the centers of both of the squares coincided, and the positive electrode layer 102 was filled with 120 μL (30 $\mu L/cm^2$) of the above non-aqueous electrolytic solution. The oxygen channel and collector 103 and the positive electrode layer 102 were stacked so that three sides of the positive electrode layer 102 overlapped three sides of the oxygen channel and collector 103.

The laminated structural body was restrained by glass plates 109 and stainless steel plates 110 with interposed springs 114, and fixed by fixing washers 112 and fixing screws 111. At this time, the fixing screws 111 were used for adjustment to apply a pressure of 13 to 14 $N/cm^2$ to the positive electrode 101, the negative electrode 105, and the separator 108, and thus the lithium-air cell 100 was obtained.

Although the lithium-air cell 100 is a single-layer cell, the face for intake of oxygen was limited to the cross section of the oxygen channel and collector 103 by sandwiching the oxygen channel and collector 103 between the glass plates 109.

The discharge capacity was measured using a charge/discharge evaluation apparatus (TOSCAT-3100) manufactured by TOYO SYSTEM CO., LTD. A discharge condition was set so as to apply a current at a current density of 0.4 $mA/cm^2$ per electrode area (i.e., 1.6 mA for a cell having an electrode of 4 $cm^2$), and the discharge capacity was determined by performing a discharge until a cut-off voltage of 2.0 V was reached.

Example 2

In the oxygen channel and collector 103, polyester fibers, as longitudinal fibers, having a fiber diameter (that is also referred to as "longitudinal fiber diameter" in the present application) of 27 μm and polyester fibers, as lateral fibers, having a fiber diameter (that is also referred to as "lateral fiber diameter" in the present application) of 100 μm were used, thereby producing a mesh-formed structural body (i.e., conductive mesh-formed structural body having different diameters) constituted by a structure that the mesh formed of the longitudinal fibers having a longitudinal fiber density of 130 fibers/inch (=5.1 fibers/mm) and the lateral fibers having a lateral fiber density of 60 fibers/inch (=2.4 fibers/mm) was plated with copper and nickel. The produced mesh-formed structural body was used as the oxygen channel and collector 103. Example 2 of the present application was carried out in the same manner as Example 1 except for the structure of the oxygen channel and collector 103.

In the oxygen channel and collector 103 used in Example 2 of the present application, the area density, the planar opening ratio, and the cross-sectional opening ratio thereof were 3.8 $mg/cm^2$, 66%, and 64%, respectively. The thickness was calculated as the sum of the longitudinal fiber diameter and the lateral fiber diameter, and the result was 127 μm.

Example 3

In the oxygen channel and collector 103, polyester fibers, as longitudinal fibers, having a fiber diameter (that is also referred to as "longitudinal fiber diameter" in the present application) of 27 μm and polyester fibers, as lateral fibers, having a fiber diameter (that is also referred to as "lateral fiber diameter" in the present application) of 70 μm were used, thereby producing a mesh-formed structural body (i.e., conductive mesh-formed structural body having different diameters) constituted by a structure that the mesh formed of the longitudinal fibers having a longitudinal fiber density of 130 fibers/inch (=5.1 fibers/mm) and the lateral fibers having a lateral fiber density of 70 fibers/inch (=2.8 fibers/mm) was plated with copper and nickel. The produced mesh-formed structural body was used as the oxygen channel and collector 103. Example 3 of the present application was carried out in the same manner as Example 1 except for the structure of the oxygen channel and collector 103.

In the oxygen channel and collector 103 used in Example 3 of the present application, the area density; the planar opening ratio, and the cross-sectional opening ratio thereof were 2.7 $mg/cm^2$, 70%, and 61%, respectively. The thickness was calculated as the sum of the longitudinal fiber diameter and the lateral fiber diameter, and the result was 97 μm.

Comparative Example 1

As the oxygen channel and collector 103, a conductive mesh-formed structural body (manufactured by SEIREN CO., LTD.) was used wherein the conductive mesh-formed structural body has the same diameter using the same polyester fibers having the same fiber diameter of 29 μm as longitudinal fibers and lateral fibers and is constituted by a structure that the mesh formed of the longitudinal fibers having a longitudinal fiber density of 90 fibers/inch (=3.5 fibers/mm) and the lateral fibers having a lateral fiber density the same as the longitudinal fiber density was plated with copper and nickel. In the oxygen channel and collector 103 used in Comparative Example 1 of the present application, the area density; the planar opening ratio, and the cross-sectional opening ratio thereof were 1.3 mg/cm$^2$, 81%, and 46%, respectively. The thickness was calculated as the sum of the longitudinal fiber diameter and the lateral fiber diameter, and the result was 58 μm. Comparative Example 1 of the present application was carried out in the same manner as Example 1 except for the structure of the oxygen channel and collector 103.

Comparative Example 2

As the oxygen channel and collector 103, Al Celmet (registered trademark) #6 (product number) manufactured by Sumitomo Electric Industries, Ltd. was used, and the thickness was set to 1000 μm in order to maintain the structure as an oxygen channel and collector. In the oxygen channel and collector 103 used in Comparative Example 2 of the present application, the area density; the planar opening ratio, and the cross-sectional opening ratio thereof were 13.5 mg/cm$^2$, 87%, and 91%, respectively.

The planar opening ratio and the cross-sectional opening ratio of the oxygen channel and collector 103 of Comparative Example 2 were determined as follows. The oxygen channel and collector 103 was filled with a resin, and then polished to obtain a plane and a cross section. The plane and the cross section were observed with a digital microscope (VHX-6000, manufactured by KEYENCE CORPORATION), and the ratio of the void portions therein was calculated to determine its planar opening ratio and its cross-sectional opening ratio. The reason why this method was used is because in the structural body formed of a porous metal body as in each of the Comparative Examples of the present application, voids as a cause of porosity are irregularly present, and thus the above-described calculation method used for calculating the planar opening ratio and the cross-sectional opening ratio of the structural body including resin fibers in a mesh form cannot be applied.

Comparative Example 2 of the present application was carried out in the same manner as Example 1 except for the structure (including the thickness) of the oxygen channel and collector 103 and the method of calculating its planar opening ratio and its cross-sectional opening ratio.

Comparative Example 3

As the oxygen channel and collector 103, Ni Celmet (registered trademark) #8 (product number) manufactured by Sumitomo Electric Industries, Ltd. was used, and the thickness was set to 1200 μm in order to maintain the structure as an oxygen channel and collector. In the oxygen channel and collector 103 used in Comparative Example 3 of the present application, the area density, the planar opening ratio, and the cross-sectional opening ratio thereof were 32.5 mg/cm$^2$, 84%, and 84%, respectively.

The planar and cross-sectional opening ratios of the oxygen channel and collector 103 of Comparative Example 3 were determined in the same manner as in Comparative Example 2 as follows. The polished plane and the polished cross section of the sample filled with a resin were observed with a digital microscope (VHX-6000, manufactured by KEYENCE CORPORATION), and the ratio of the void portions therein was calculated to determine its planar opening ratio and its cross-sectional opening ratio.

Comparative Example 3 of the present application was carried out in the same manner as Example 1 except for the structure (including the thickness) of the oxygen channel and collector 103 and the method of calculating its planar opening ratio and its cross-sectional opening ratio.

Table 1 shows specifications and characteristics of the oxygen channel and positive electrode collectors used in the Examples and Comparative examples of the present application. Table 1 also shows the discharge capacity of a lithium-air cell produced using each oxygen channel and positive electrode collector.

TABLE 1

| | Longitudinal Fiber Diameter μm | Lateral Fiber Diameter μm | Ratio: Lateral Fiber Diameter/ Longitudinal Fiber Diameter | Longitudinal Fiber Density fibers/mm (fibers/inch) | Lateral Fiber Density fibers/mm (fibers/inch) | Area Density mg/cm$^2$ | Planar Opening Ratio % | Cross-Sectional Opening ratio % | Thickness μm | Discharge Capacity mAh/cm$^2$ |
|---|---|---|---|---|---|---|---|---|---|---|
| Example 1 | 27 | 100 | 3.7 | 5.1 (130) | 2.0 (50) | 3.5 | 69 | 67 | 127 | 13.9 |
| Example 2 | 27 | 100 | 3.7 | 5.1 (130) | 2.4 (60) | 3.8 | 66 | 64 | 127 | 12.2 |
| Example 3 | 27 | 70 | 2.4 | 5.1 (130) | 2.8 (70) | 2.7 | 70 | 61 | 97 | 11.7 |
| Comparative Example 1 | 29 | 29 | 1 | 3.5 (90) | 3.5 (90) | 1.3 | 81 | 46 | 58 | 10.1 |
| Comparative Example 2 | — | — | — | — | — | 13.5 | 87 | 91 | 1000 | 16.9 |
| Comparative Example 3 | — | — | — | — | — | 32.5 | 84 | $4 | 1200 | 16.1 |

In each of Examples 1 to 3, as described above, the oxygen channel and collector 103 is a structural body including, as resin fibers, two kinds of resin fibers of longitudinal fibers and lateral fibers in a mesh form, wherein the fiber diameters of the longitudinal fibers and the lateral fibers are different each other (that is, two kinds of resin fibers having different fiber diameters) (i.e., conductive mesh-formed structural body having different diameters), and in the structural body, the ratio of the lateral fiber diameter (that is, larger fiber diameter) to the longitudinal fiber diameter (that is, smaller fiber diameter) is also in a range of from 1.2 to 7. As shown in Table 1, in all of Examples 1 to 3, the oxygen channel and collector 103 has an area density of 4.0 $mg/cm^2$ or less, and both of its planar opening ratio and its cross-sectional opening ratio show a value of 60% or more.

Meanwhile, in Comparative Example 1, as described above, the oxygen channel and collector 103 is a mesh-formed structural body constituted by a structure obtained by applying a conductive treatment to the mesh formed of resin fibers of longitudinal fibers and lateral fibers wherein the diameters of the longitudinal fibers and the lateral fibers are the same each other (that is, conductive mesh-formed structural body having same diameter). As shown in Table 1, the oxygen channel and collector 103 of Comparative Example 1 has a light weight of 1.3 $mg/cm^2$ of the area density, but has a cross-sectional opening ratio of 46%, which is much lower than the target opening ratio of 60%.

Therefore, it has been confirmed that the cross-sectional opening ratio can be significantly improved in the case of using, as an oxygen channel for air cells, the conductive mesh-formed structural body having different diameters as shown in Examples 1 to 3, compared with the case of using, as an oxygen channel for air cells, the conductive mesh-formed structure having same diameter as shown in Comparative Example 1.

As described above, in Comparative Examples 2 and 3, the porous metal body formed of Al and the porous metal body formed of Ni are used as the oxygen channel and collector 103, respectively. In both of the above Comparative Examples, although each opening ratio is high, each area density shows a value as large as 13.5 $mg/cm^2$ and 32.5 $mg/cm^2$. This can be understood as the following reasons: an oxygen channel and collector including multiple pores needs to have a large thickness as shown in Table 1 in order to maintain the structure as an oxygen channel for air cells, and thus becomes to inherently have a large area density. In order to realize an air cell having a high gravimetric energy density, the area density is desirably 4 $mg/cm^2$ or less, but it has been confirmed that in Comparative Examples 2 and 3, the area density is much more than the value.

Meanwhile, as described above, it has been confirmed that in all of Examples 1 to 3, the oxygen channel and collector 103 has an area density of 4.0 $mg/cm^2$ or less and an air cell having a high gravimetric energy density can be realized.

In addition, from the discharge capacities of the lithium-air cells of Examples 1 to 3 and Comparative Example 1, it has been confirmed that in the case of using, as the oxygen channel and collector 103, the conductive mesh-formed structural body having different diameters shown in each of Examples 1 to 3, the discharge capacity is higher than in the case of using, as the oxygen channel and collector 103, the conductive mesh-formed structural body having same diameter shown in Comparative Example 1 and oxygen was successfully taken in.

INDUSTRIAL APPLICABILITY

According to the present invention, as an oxygen channel and a collector constituting a positive electrode of an air cell, an oxygen channel for air cells capable of making its weight lighter, making both of its planar opening ratio and its cross-sectional opening ratio higher, and making its size smaller, and making capacity of the cells higher can be provided, and thus the abilities that air cells have potentially, that is, the abilities of making size of the air cells smaller, making weight of the air cells lighter, making capacity of the air cells greater, and the like can be improved. Thus, the present invention has an applicability in an air cell suitable for making size of the air cells smaller, making weight of the air cells lighter, and making capacity of the air cells greater, and is expected to be preferably used in an air cell whose demand would greatly increase in the future.

REFERENCE SIGNS LIST

100 Lithium-air cell
101 Positive electrode
102 Positive electrode layer
103 Oxygen channel and collector (or Oxygen channel and positive electrode collector)
104 Positive electrode lead
105 Negative electrode
106 Negative electrode active material layer
107 Negative electrode collector
108 Separator
109 Glass plate(s)
110 Stainless steel plate(s)
111 Fixing screw(s)
112 Fixing washer(s)
113 Strut(s)
114 Spring(s)
115 Spacer(s)

The invention claimed is:

1. An oxygen channel for air cells comprising a structural body including two kinds of resin fibers in a mesh form, the two kinds of resin fibers having different fiber diameters, wherein in the two kinds of resin fibers, a ratio of a fiber diameter of resin fibers having a larger fiber diameter to a fiber diameter of resin fibers having a smaller fiber diameter is in a range of from 1.2 to 7, wherein the structural body includes the two kinds of resin fibers in a mesh form having a structure of alternately crossing the two kinds of resin fibers one by one, the structural body has a planar opening ratio of 50% or more, the planar opening ratio being a ratio of an opening area per unit area in a plane of the structural body, the structural body has a cross-sectional opening ratio of 50% or more, the cross-sectional opening ratio being a ratio of an opening area per unit area in a cross section of the structural body, wherein the plane of the structural body is a face viewed from a direction in which cross-stripes due to crossing of the two kinds of resin fibers are seen in a plane, and the cross section of the structural body is a face of a cut opening obtained by cutting the structural body in a vertical direction, the cut opening viewed from right beside, the planar opening ratio (%) and the cross-sectional opening ratio (%) are determined by calculation formulas described below:

[Mathematical 1]

$$\text{"Planar opening ratio (\%)"} = \frac{A \times B}{C \times D} \times 100 \quad \text{(Formula 1)}$$

"A" represents a lateral length of an opening portion and is defined by a formula described below:

"A"="1/density of resin fibers having a smaller fiber diameter (fibers/mm)"−"a fiber diameter of one resin fiber having a smaller fiber diameter (μm)/1000 (μm/mm)", "B" represents a longitudinal length of the opening portion and is defined by a formula described below:

"B"="1/density of resin fibers having a larger fiber diameter (fibers/mm)"–"a fiber diameter of one resin fiber having a larger fiber diameter (μm)/1000 (μm/mm)", "C" represents an adjacent between the resin fibers having a smaller fiber diameter and is defined by a formula described below:

"C"="1/density of resin fibers having a smaller fiber diameter (fibers/mm)",

"D" represents an adjacent between the resin fibers having a larger fiber diameter and is defined by a formula described below:

"D"="1/density of resin fibers having a larger fiber diameter (fibers/mm)",

[Mathematical 2]

[Mathematical 2]

$$\text{“Cross-sectional opening ratio (\%)”} = \frac{E \times F - (S + T)}{E \times F} \times 100 \quad \text{(Formula 2)}$$

"E" represents a height of a unit cross-sectional area and is defined by a formula described below:

"E"="a fiber diameter of one resin fiber having a larger fiber diameter (μm)/1000 (μm/mm)"+"a fiber diameter of one resin fiber having a smaller fiber diameter (μm)/1000 (μm/mm)", "F" represents a lateral length of the unit cross-sectional area and is defined by a formula described below:

"F"="1/density of resin fibers having a larger fiber diameter (fibers/mm)",

"S" represents an area of resin fibers having a larger fiber diameter in the unit cross-sectional area, and is defined by a formula described below:

"S"=("a fiber diameter of one resin fiber having a larger fiber diameter (μm)/1000 (μm/mm)"/2)$^2$×3.14, "T" represents an area of a resin fiber having a smaller fiber diameter in the unit cross-sectional area, and is defined by a formula described below:

"T"="a fiber diameter of resin fibers having a smaller fiber diameter (μm)/1000 (μm/mm)"×"1/density of resin fibers having a larger fiber diameter (fibers/mm)".

2. The oxygen channel for air cells according to claim 1, wherein the ratio of the fiber diameter of the resin fibers having the larger fiber diameter to the fiber diameter of the resin fibers having the smaller fiber diameter is in a range of from 2 to 6.

3. The oxygen channel for air cells according to claim 1, wherein the fiber diameter of the resin fibers having the smaller fiber diameter is in a range of from 10 μm or more to 50 μm or less.

4. The oxygen channel for air cells according to claim 1, wherein the fiber diameter of the resin fibers having the smaller fiber diameter is in a range of from 20 μm or more to 40 μm or less.

5. The oxygen channel for air cells according to claim 1, wherein the number of the resin fibers having the larger fiber diameter per unit length is in a range of from 1.0/mm or more to 3.6/mm or less, and the number of the resin fibers having the smaller fiber diameter per unit length is in a range of from 3.0/mm or more to 6.4/mm or less.

6. The oxygen channel for air cells according to claim 1, wherein the structural body has a thickness in a range of from 50 μm or more to 300 μm or less.

7. The oxygen channel for air cells according to claim 1, wherein the structural body has a thickness in a range of from 100 μm or more to 200 μm or less.

8. The oxygen channel for air cells according to claim 1, wherein the mesh form has a structure of alternately crossing the two kinds of resin fibers having the different fiber diameters one by one.

9. The oxygen channel for air cells according to claim 1, wherein the planar opening ratio is 60% or more.

10. The oxygen channel for air cells according to claim 1, wherein the cross-sectional opening ratio is 60% or more.

11. The oxygen channel for air cells according to claim 1, having an area density of 10 mg/cm$^2$ or less.

12. The oxygen channel for air cells according to claim 1, having an area density of 4.0 mg/cm$^2$ or less.

13. The oxygen channel for air cells according to claim 1, wherein the two kinds of resin fibers having the different fiber diameters include at least a polyester.

14. A collector comprising the oxygen channel for air cells according to claim 1, wherein the two kinds of resin fibers having the different fiber diameters are coated with a conductive substance.

15. The collector according to claim 14, wherein the conductive substance is at least one metal selected from the group consisting of Ni, Cu, W, Al, Au, Ag, Pt, Fe, and Ti or an alloy containing the at least one metal.

16. An air cell comprising:

a negative electrode;

a separator filled with a non-aqueous electrolytic solution; and a positive electrode, wherein the positive electrode includes a positive electrode layer, an oxygen channel for intake of oxygen as an active material, and a collector, and wherein the oxygen channel is the oxygen channel for air cells according to claim 1.

17. An air cell comprising:

a negative electrode;

a separator filled with a non-aqueous electrolytic solution; and a positive electrode, wherein the positive electrode includes a positive electrode layer, a collector including an oxygen channel for intake of oxygen as an active material, and a positive electrode lead, and wherein the collector is the collector according to claim 14.

* * * * *